(12) United States Patent
Takahata et al.

(10) Patent No.: US 7,427,081 B2
(45) Date of Patent: Sep. 23, 2008

(54) PASSENGER PROTECTION SYSTEM WHICH DETECTS CLOSENESS OF PASSENGER TO INNER SIDE SURFACE OF INTERIOR

(75) Inventors: Osamu Takahata, Kawachi-gun (JP); Shigeo Tobaru, Kawachi-gun (JP); Naotoshi Takemura, Kawachi-gun (JP); Yoshimasa Eguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 11/248,647

(22) Filed: Oct. 12, 2005

(65) Prior Publication Data
US 2006/0082111 A1    Apr. 20, 2006

(30) Foreign Application Priority Data
Oct. 18, 2004  (JP)  .............................. 2004-302698

(51) Int. Cl.
B60R 21/16  (2006.01)
(52) U.S. Cl. .............. 280/730.2; 280/728.2; 280/730.1; 280/735; 280/749; 180/274
(58) Field of Classification Search .............. 280/728.2, 280/730.1, 730.2, 735, 749; 180/274
See application file for complete search history.

(56) References Cited

U.S. PATENT DOCUMENTS

| | | | | |
|---|---|---|---|---|
| 5,549,325 A | * | 8/1996 | Kiribayashi et al. | ......... 280/735 |
| 6,236,035 B1 | * | 5/2001 | Saar et al. | .................... 250/221 |
| 6,386,581 B1 | * | 5/2002 | Ohno | ........................... 280/735 |
| 6,416,080 B1 | * | 7/2002 | Gillis et al. | .................. 280/735 |
| 6,533,316 B2 | * | 3/2003 | Breed et al. | .................. 280/735 |
| 6,618,655 B2 | * | 9/2003 | Tobaru et al. | ................. 701/45 |
| 2001/0028163 A1 | * | 10/2001 | Breed | .......................... 280/735 |

FOREIGN PATENT DOCUMENTS

| | | |
|---|---|---|
| JP | 2001-071787 | 3/2001 |
| JP | 2002-362295 | 12/2002 |

* cited by examiner

*Primary Examiner*—Christopher Ellis
*Assistant Examiner*—Jacob Meyer
(74) *Attorney, Agent, or Firm*—Rankin, Hill & Clark LLP

(57) ABSTRACT

A passenger protection system for a vehicle having a door opening to which a door is attached. The system has an airbag attached in a folded form along an upper edge of the door opening, wherein when being expanded, the airbag is deployed along an inner side surface of an interior of the vehicle in a drawn curtain form; a contact detecting device for detecting a contact action of a passenger in the vehicle with the contact detecting device; and a control device for determining whether a passenger is close to the inner side surface based on a result of detection of the contact detecting device, and prohibiting deployment of the airbag while determining that a passenger is close to the inner side surface. The contact detecting device may have an elongated form in a length direction of the vehicle and consist of divided portions separated in a vertical direction.

7 Claims, 5 Drawing Sheets

PASSENGER PROTECTION SYSTEM WHICH DETECTS CLOSENESS OF PASSENGER TO INNER SIDE SURFACE OF INTERIOR

BACKGROUND OF THE INVENTION

1. Field of the Invention

The present invention relates to a passenger protection system having an airbag which is deployed along an inner side surface of the interior of a vehicle in a form such as that of a drawn curtain.

Priority is claimed on Japanese Patent Application No. 2004-302698, filed Oct. 18, 2004, the content of which is incorporated herein by reference.

2. Description of the Related Art

Regarding a passenger protection system having an airbag which is deployed along an inner side surface of the interior of a vehicle in a form such as that of a drawn curtain, in order to smoothly deploy the airbag between the inner side surface and a passenger, a technique is known in which the passenger is pushed toward the inside of the interior from the inner side surface, specifically, by using a pushing device arranged around a window (see Reference 1: Japanese Unexamined Patent Application, First Publication No. 2002-362295). In addition, in order to control the deployment of the airbag, a technique is known for determining whether there is a possibility of vehicle roll-over occurring, based on a roll angle and a roll angular velocity (see Reference 2: Japanese Unexamined Patent Application, First Publication No. 2001-071787).

In the above technique as disclosed in Reference 1, it is of course necessary to secure a space for arranging the pushing device arranged around a window; thus, the space of the interior of the vehicle is somewhat reduced. In addition, the pushing device must operate before the deployment of the airbag; thus, an expensive device having high responding performance is necessary.

SUMMARY OF THE INVENTION

In light of the above circumstances, an object of the present invention is to provide a passenger protection system for smoothly deploying an airbag between passenger(s) and an inner side surface of an interior of a vehicle without reducing the space of the interior or increasing the manufacturing cost.

Therefore, the present invention provides a passenger protection system (e.g., a passenger protection system 41 in embodiments explained below) for a vehicle (e.g., a vehicle 1 in the embodiments) having a door opening (e.g., a front door opening 5 or a rear door opening 6 in the embodiments) to which a door is attached, the system comprising:

an airbag (e.g., a side curtain airbag 40 in the embodiments) attached in a folded form along an upper edge of the door opening, wherein when being expanded, the airbag is deployed along an inner side surface (e.g., an inner surface 3a or 4a in the embodiments) of an interior (e.g., an interior 9 in the embodiments) of the vehicle in a drawn curtain form;

a contact detecting device (e.g., a contact detecting device 44 or 45 in the embodiments) for detecting a contact action of a passenger in the vehicle with the contact detecting device; and a control device for determining whether a passenger is close to the inner side surface based on a result of detection of the contact detecting device, and prohibiting deployment of the airbag while determining that a passenger is close to the inner side surface.

According to the above structure, while detecting that a passenger is close to an inner side of the interior of the vehicle by the contact detecting device for detecting the closeness to the inner side surface through a contact action of the passenger, the control device prohibits deployment of the airbag. Therefore, the airbag can be smoothly deployed between passenger(s) and the inner side surface when no passenger is close to the inner side surface, that is, when a specific distance is secured between the passenger(s) and the inner side surface. Accordingly, only the contact detecting device provided for detecting that a passenger is close to the inner side surface through a contact action of the passenger is necessary; thus, the system for smoothly deploying the airbag between passenger(s) and the inner side surface can be realized at low cost, without reducing the space of the interior of the vehicle.

Preferably, the contact detecting device has an elongated form in a length direction of the vehicle. Accordingly, even when the position of a passenger in a seat (which is close to the inner side surface and can be slid) shifts due to sliding of the seat or the like, it is possible to detect whether the passenger is close to the inner side surface.

In this case, it is possible that:

the vehicle has a sliding seat beside the door, which can slide in the length direction of the vehicle; and the contact detecting device has a length by which the contact action of the passenger can be detected wherever the sliding seat is positioned.

In a typical example, the contact detecting device consists of a plurality of divided portions separated in a vertical direction, wherein each divided portion independently detects the contact action of the passenger.

Each divided portion may include a plurality of spot touch sensors aligned in a length direction of the vehicle.

Preferably, only when every divided portion detects the contact action, the control device determines that a passenger is close to the inner side surface and prohibits the deployment of the airbag. In addition, when only a small number of the divided portions detect the contact action, it may be determined that only an elbow (or another part of the body) of the passenger is close to the inner side surface and that no passenger is close to the inner side surface. Therefore, when only an elbow (or another part of the body) of the passenger is close to the inner side surface, the airbag can be deployed without prohibiting the deployment of the airbag.

In another typical example, when an angle of inclination of the vehicle is equal to or greater than a predetermined value, the control device deploys the airbag regardless of a result of detection by the contact detecting device. Accordingly, it is possible to prevent a situation such that the airbag is not deployed although the deployment is necessary.

In another typical example, the vehicle has a plurality of doors along a side of the vehicle, and the air bag is attached along an upper edge of door openings of the doors;

the contact detecting device is provided for each door;

the control device prohibits the deployment of the airbag while determining that a passenger is close to the inner side surface based on a result of detection of any contact detecting device.

In this case, it is possible that:

each contact detecting device consists of a plurality of divided portions separated in a vertical direction, wherein each divided portion independently detects the contact action of the passenger;

for each contact detecting device, the control device determines that a passenger is close to the inner side surface only when every divided portion of the contact detecting device detects the contact action; and the control device prohibits the deployment of the airbag while determining that any passenger is close to the inner side surface based on a result of detection of any contact detecting device.

DETAILED DESCRIPTION OF THE INVENTION

Hereinafter, embodiments of a passenger protection system according to the present invention will be described with reference to FIGS. 1 to 4.

Figure 1:
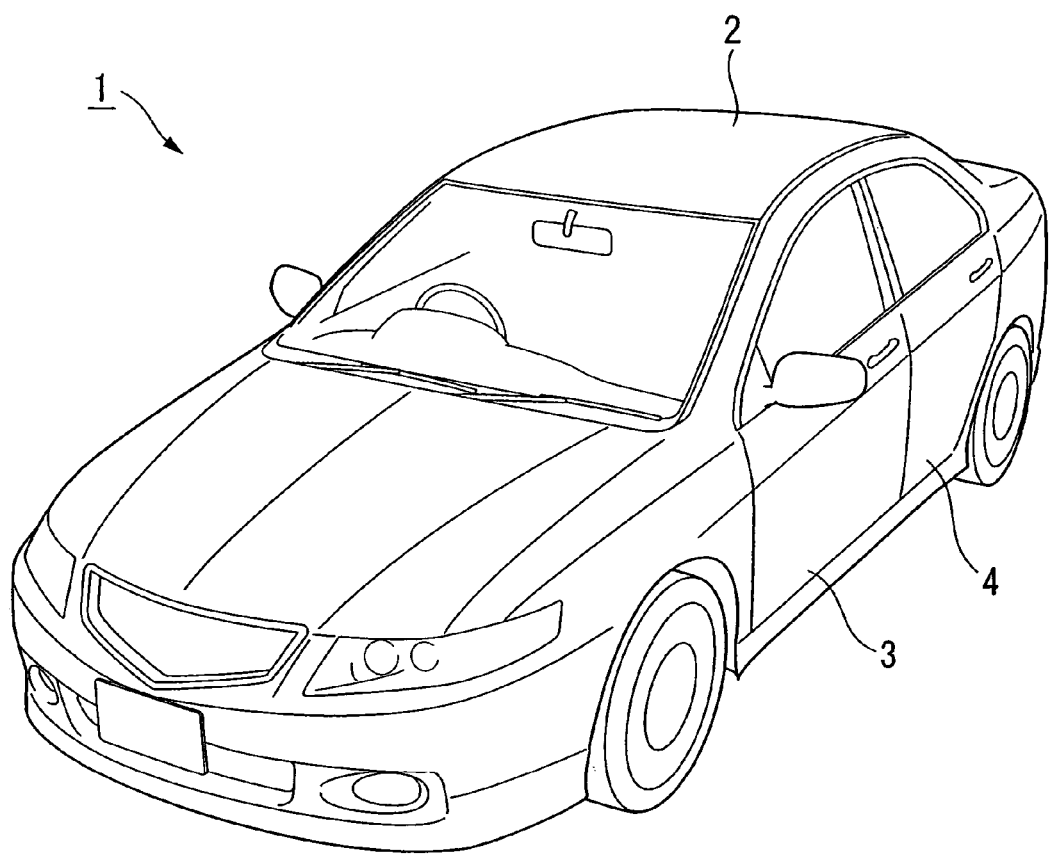
FIG. 1 is a perspective view showing a vehicle to which a passenger protection system as the first embodiment of the present invention is applied.
Figure 2:
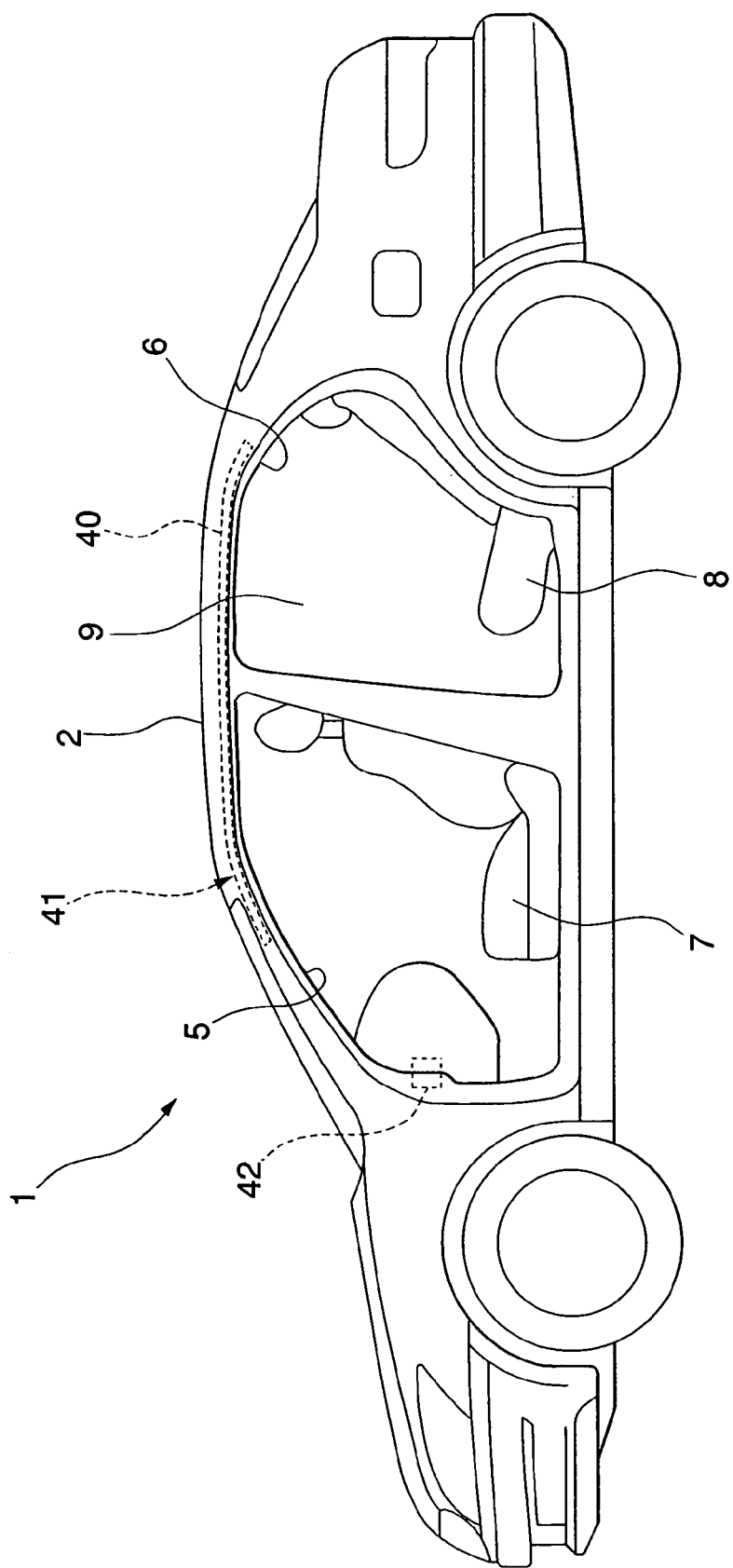
FIG. 2 is a side view of the vehicle, in which the doors are not shown, in the first embodiment.

FIG. 1 is a perspective view showing a vehicle to which a passenger protection system as the first embodiment of the present invention is applied. FIG. 2 is a side view of the vehicle, in which the doors are not shown.

As shown in FIG. 1, a front door 3 and a rear door 4 are provided along a side of a body 2 of a vehicle 1. As shown in FIG. 2, a front door opening 5 (i.e., a door opening) and a rear door opening 6 (i.e., a door opening) are provided, into which the front door 3 and the rear door 4 are respectively fitted. The front door opening 5, through which a passenger can get in or out the vehicle 1, can be closed by the front door 3, and the rear door opening 6, through which a passenger can also get in or out the vehicle 1, can be closed by the rear door 4. In an interior 9 of the vehicle 1, a front seat 7, which a passenger can access through the front door opening 5, and a rear seat 8, which a passenger can access through the rear door opening 6, are provided such that they are separated in the front-rear direction (i.e., the length direction) of the vehicle.

Figure 3:
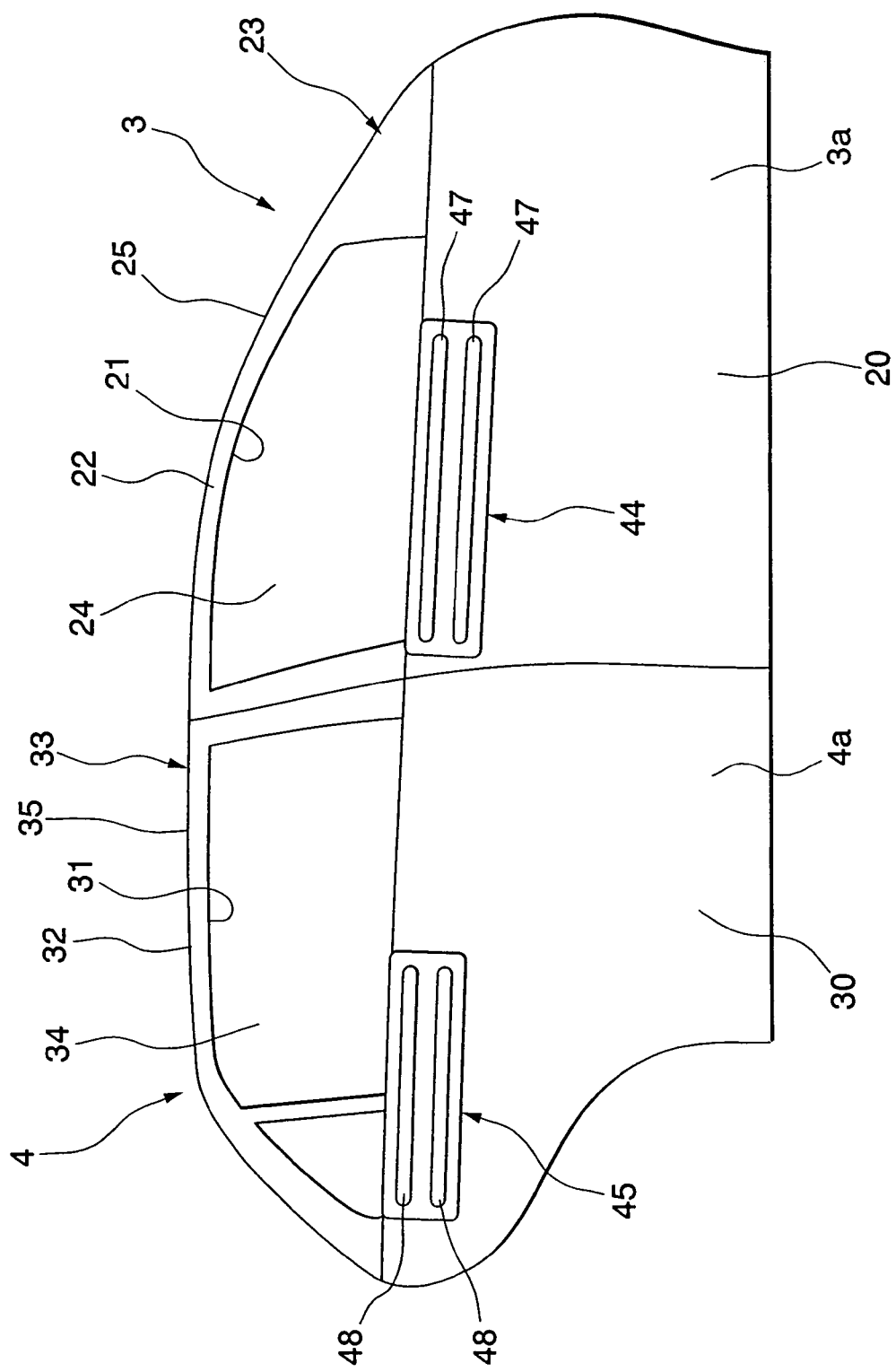
FIG. 3 is a side view showing the doors of the vehicle, as viewed from the interior of the vehicle, in the first embodiment.

FIG. 3 is a side view showing the doors of the vehicle 1, as viewed from the interior of the vehicle 1. As shown in FIG. 3, the front door 3 has a main body 23 which includes a lower body 20 and a sash portion 22. The sash portion 22 has a window opening 21. The front door 3 also has a windowpane 24 which is lowered or raised so as to open or close the window opening 21. When being lowered, the windowpane 24 enters the lower body 20. The sash portion 22 and the windowpane 24 constitute a window section 25 as an upper portion of the front door 3. Similarly, the rear door 4 has a main body 33 which includes a lower body 30 and a sash portion 32, and the sash portion 32 has a window opening 31. The rear door 4 also has a windowpane 34 which is lowered or raised so as to open or close the window opening 31. When being lowered, the windowpane 34 enters the lower body 30. The sash portion 32 and the windowpane 34 constitute a window section 35 as an upper portion of the rear door 4. When the front door 3 and the rear door 4 are closed, the doors form a side portion of the interior 9; thus, an inner surface 3a of the front door 3 and an inner surface 4a of the rear door 4, which face the interior 9, form an inner side surface of the interior 9.

As shown in FIG. 2, a side curtain airbag 40 (i.e., an airbag) is attached to the vehicle body 2 along the upper edges of the front door opening 5 and the rear door opening 6 in a folded form. This side curtain airbag 40 is expanded by receiving high-pressure gas which is generated by an inflator (not shown) and is deployed mainly over upper portions of the inner surfaces 3a and 4a of the front door 3 and the rear door 4, that is, over the window sections 25 and 35, in a form such as that of a drawn curtain.

The side curtain airbag 40 forms a passenger protection system 41 together with other airbags (not shown), a control device 42, and the like. The operation of the side curtain airbag 40 is controlled by the control device 42.

The control device 42 determines the possibility of whether the vehicle is going to roll over by using sensors (not shown) for detecting behavior of the vehicle 1. Basically, when it is determined that the possibility is high, the control device 42 activates and deploys the side curtain airbag 40 simultaneously with the determination or when a predetermined delay period of time has elapsed after the determination.

As shown in FIG. 3, the first embodiment employs (i) a contact detecting device 44 provided for detecting whether a passenger is close to the inner surface 3a of the front door 3, according to a contact action of the passenger, and (ii) a contact detecting device 45 provided for detecting whether a passenger is close to the inner surface 4a of the rear door 4, according to a contact action of the passenger.

More specifically, the contact detecting device 44 for the front door 3 has a plurality of (here, two) touch sensors 47 (corresponding to divided portions of the present invention) which have a linear form along the length of the vehicle and are provided on the inner surface 3a of the front door 3 at an upper region of the lower body 20. The touch sensors 47 are separately positioned in the vertical direction and have the same length and position in the length direction of the vehicle. The length of the touch sensors 47 corresponds to a sliding range of the front seat 7 in the length of the vehicle, where the position of the front seat 7 matches the position of the front door 3 in the length of the vehicle. That is, the touch sensors 47 have a length and a position by which a contact action of a passenger in the front seat 7 can be detected wherever the front seat 7 is positioned in the length of the vehicle.

Similarly, the contact detecting device 45 for the rear door 4 has a plurality of (here, two) touch sensors 48 (corresponding to divided portions of the present invention) which have a linear form along the length of the vehicle and are provided on the inner surface 4a of the rear door 4 at an upper region of the lower body 30. The touch sensors 48 are also separately positioned in the vertical direction and have the same length and position in the length direction of the vehicle. The touch sensors 48 have a length and a position by which a contact action of a passenger in the rear seat 8 can be detected, where the position of the rear seat 8 matches the position of the rear door 4 in the length of the vehicle.

As described above, the control device 42 determines the possibility of whether the vehicle 1 is going to roll over, and basically deploys the side curtain airbag 40 when it is determined that the possibility is high. Before the deployment, the control device 42 determines whether the passenger is close to the inner surface 3a of the front door 3 by using the contact detecting device 44, and also determines whether the passenger is close to the inner surface 4a of the rear door 4 by using the contact detecting device 45. According to the results of the determination, the control device 42 controls whether the deployment of the side curtain airbag 40 is permitted or prohibited.

Figure 4A:
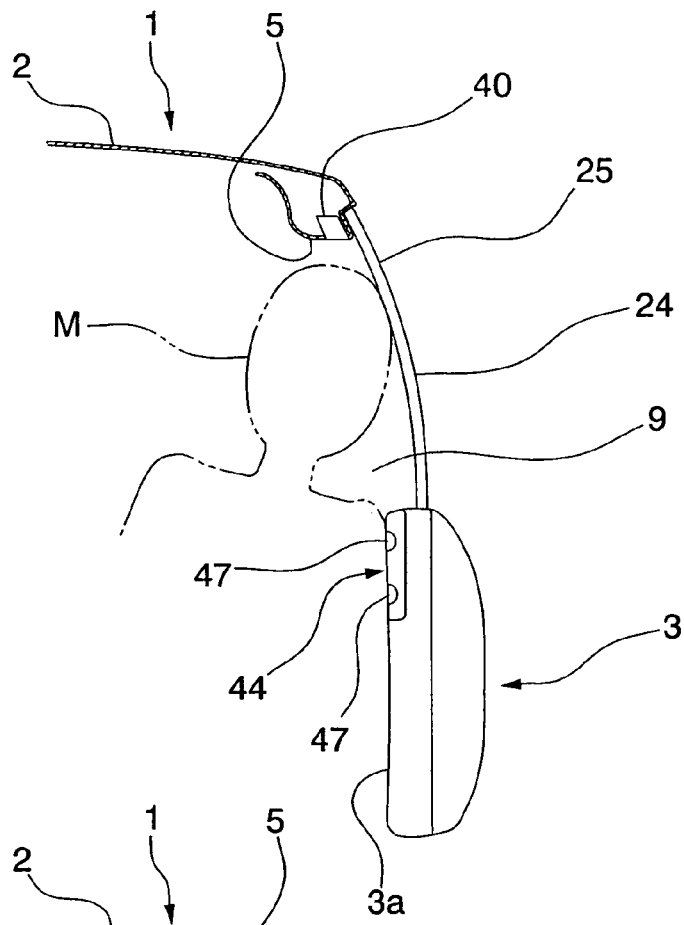
FIGS. 4A and 4B are general front views of the front door, when viewed from the front of the vehicle, in the first embodiment.
Figure 4B:
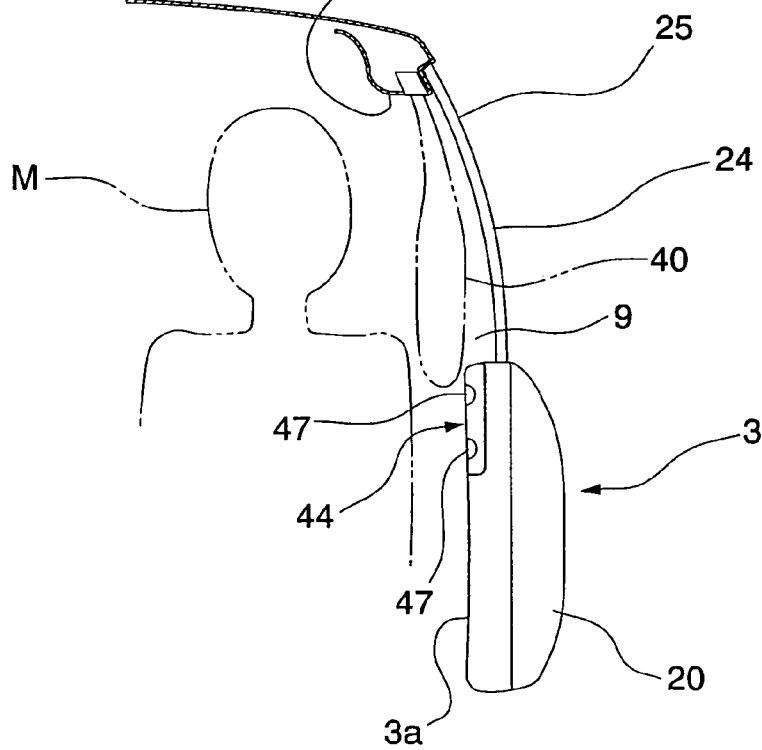

In more detail, the control device 42 determines whether a contact action of a passenger has been detected by every touch sensor 47 of the contact detecting device 44 for the front door 3. FIGS. 4A and 4B are general front views of the front door 3, when viewed from the front of the vehicle. When a contact action of a passenger M (i.e., any passenger) is detected by every touch sensor 47 on the front door 3, it is determined that the whole body of the passenger M is close to the inner surface 3a of the front door 3 (see FIG. 4A). On the contrary, when a contact action of the passenger M is not detected by every touch sensor 47, it is determined that the passenger M is not close to the inner surface 3a of the front door 3 (see FIG. 4B). That is, even when a contact action of the passenger M is detected by any touch sensor 47, if any other touch sensor 47 does not detect a contact action, the control device 42 determines that only an elbow (or another part of the body) of the passenger M is close to the inner surface 3a of the front door 3 and that the whole body of the passenger M is not close to the inner surface 3a, so that it is determined that the passenger M is not close to the inner surface 3a of the front door 3. In addition, when no touch sensors 47 detects a contact action, the control device 42 determines that the passenger M is not close to the inner surface 3a of the front door 3 at all, so that it is determined that the passenger M is not close to the inner surface 3a of the front door 3.

Similarly, the control device 42 also determines whether the passenger M is close to the inner surface 4a of the rear door 4, by using the contact detecting device 45 for the rear door 4.

When determining that the possibility of the vehicle 1 rolling over is high, the control device 42 prohibits deployment of the side curtain airbag 40 while at least one of the following two conditions is satisfied: the first condition is that the passenger M is close to the inner surface 3a of the front door 3, and the second condition is that the passenger M is close to the inner surface 4a of the rear door 4. In the meantime, when determining that the possibility of whether the vehicle 1 is going to roll over is high, the control device 42 activates and deploys the side curtain airbag 40 if none of the above two conditions are satisfied, that is, the passenger M is not close to either of the inner surfaces 3a and 4a.

Accordingly, it is possible to deploy the side curtain airbag 40 along the inner surface 3a of the front door 3 and the inner surface 4 of the rear door 4 in a state in which the whole body of the passenger M is not close to either of the inner surfaces 3a and 4a. Therefore, the side curtain airbag 40 can be smoothly deployed between passenger(s) M and the front door 3 and the rear door 4.

While determining that the possibility of the vehicle 1 rolling over is high and prohibiting deployment of the side curtain airbag 40, the control device 42 monitors the angle of inclination of the vehicle 1 with respect to the horizon. When the monitored angle of inclination is equal to or greater than a predetermined value, the control device 42 forcibly deploys the side curtain airbag 40 regardless of the results of detection of the contact detecting devices 44 and 45.

According to a passenger protection system 41 of the first embodiment, while detecting that the passenger M (i.e., any passenger) is close to any inner surface by at least one of the contact detecting device 44 (for detecting the closeness to the inner surface 3a of the front door 3 through a contact action of a passenger) and the contact detecting device 45 (for detecting the closeness to the inner surface 4a of the front door 4 through a contact action of a passenger), the control device 42 prohibits deployment of the side curtain airbag 40. Therefore, the side curtain airbag 40 can be smoothly deployed between passenger(s) M and the inner surfaces 3a and 4a when no passenger is close to either of the inner surface 3a of the front door 3 and the inner surface 4a of the rear door 4, that is, when a specific distance is secured between passenger(s) M and the inner surfaces 3a and 4a. As described above, only the contact detecting devices 44 and 45 for detecting that the passenger M is close to the inner surface 3a of the front door 3 and to the inner surface 4a of the front door 4 through a contact action of the passenger M are necessary; thus, the system for smoothly deploying the side curtain airbag 40 between passenger(s) M and the inner surfaces 3a and 4a can be realized at low cost, without reducing the space of the interior of the vehicle 1.

In addition, the contact detecting device 44 extends in the length of the vehicle; thus, even when the position of the passenger M in the front seat 7 (which can be slid) shifts due to sliding of the front seat 7 or the like, it is possible to detect whether the passenger M is close to the inner surface 3a of the front door 3.

Furthermore, each of the contact detecting devices 44 and 45 has a plurality of touch sensors (two touch sensors 47 or 48 in the present embodiment) arranged in the vertical direction. Therefore, the control device 42 determines that the passenger M is close to the inner surface 3a of the front door 3 when both touch sensors 47 detect a contact action of the passenger M, and that the passenger M is close to the inner surface 4a of the rear door 4 when both touch sensors 48 detect a contact action of the passenger M. In the meantime, when only one of the touch sensors 47 of the contact detecting device 44 detects a contact action of the passenger M, the control device 42 determines that only an elbow (or another part of the body) of the passenger M is close to the inner surface 3a of the front door 3 and that the passenger M is not close to the inner surface 3a, and similarly, when only one of the touch sensors 48 of the contact detecting device 45 detects a contact action of the passenger M, the control device 42 determines that only an elbow (or another part of the body) of the passenger M is close to the inner surface 4a of the rear door 4 and that the passenger M is not close to the inner surface 4a. Therefore, when only an elbow (or another part of the body) of the passenger M is close to the inner surface 3a of the front door 3 or the inner surface 4a of the rear door 4, the side curtain airbag 40 can be deployed without prohibiting the deployment of the side curtain airbag 40.

In addition, when the angle of inclination of the vehicle 1 is equal to or greater than a predetermined value, the control device 42 activates and deploys the side curtain airbag 40 regardless of the results of detection of the contact detecting devices 44 and 45. Therefore, it is possible to prevent a situation such that the side curtain airbag 40 is not deployed although the deployment is necessary.

Figure 5:
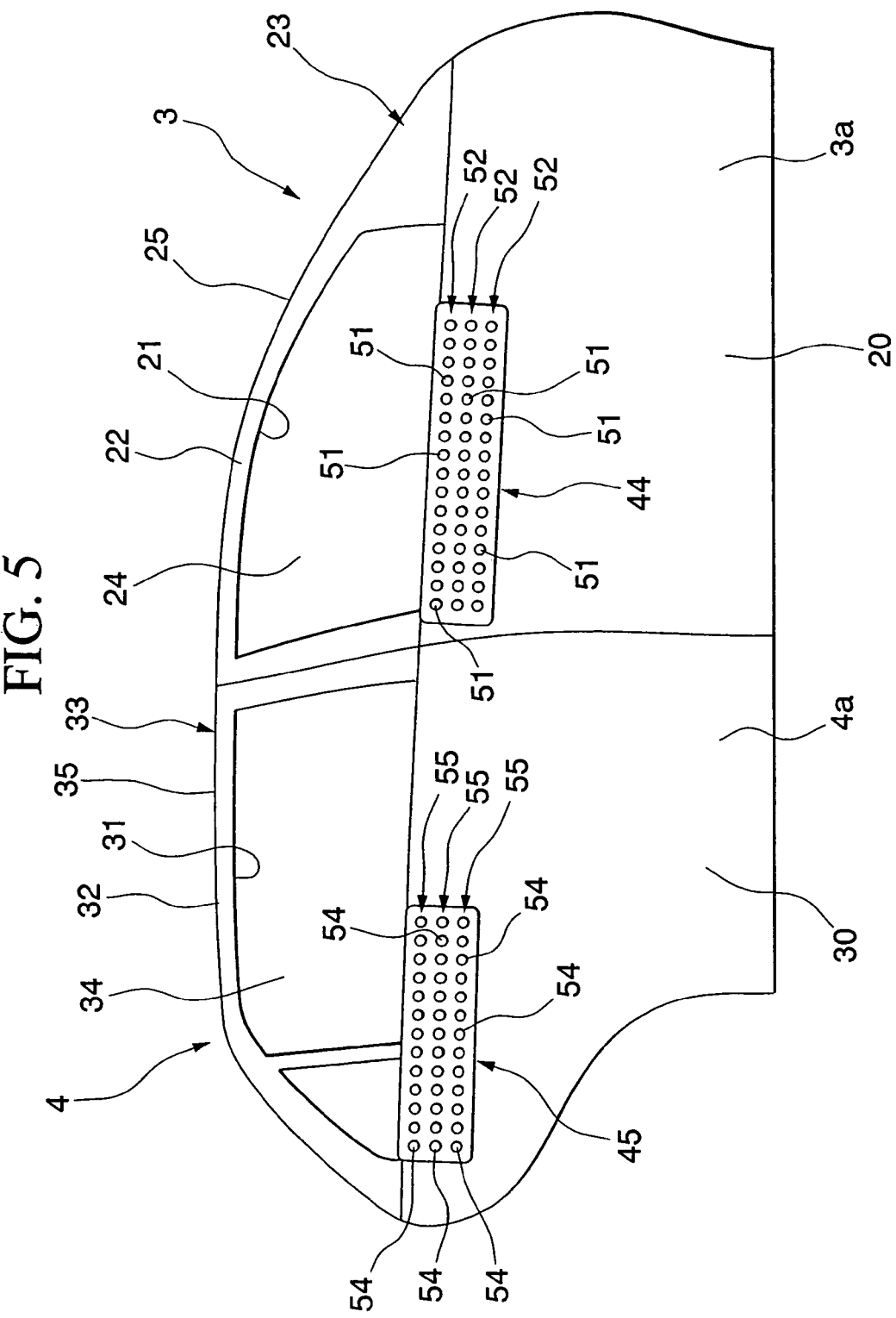
FIG. 5 is a side view showing the doors of the vehicle, as viewed from the interior of the vehicle, in the second embodiment of the present invention.

Below, the passenger protection system as the second embodiment of the present invention will be explained by mainly referring to FIG. 5, where distinctive portions of the second embodiment in comparison with the first embodiment will be mainly explained. FIG. 5 is a side view of the vehicle showing the doors of the vehicle viewed from the interior of the vehicle in the second embodiment. In FIG. 5, parts identical to those in the first embodiment are given identical reference numerals, and explanations thereof are omitted.

The second embodiment employs touch sensors which are different from those of the first embodiment. The contact detecting device 44 for the front door 3 has a number of spot touch sensors 51. A plurality of the spot touch sensors 51 (16 spot touch sensors 51 in the present embodiment) are aligned at regular intervals in the length of the vehicle so as to form a linear sensor row 52 (corresponding to a divided portion of the present invention). The position of each sensor 51 of the sensor row 52 is the same in the vertical direction. A plurality of such sensor rows 52 (three rows in the present embodiment) are arranged at regular intervals in the vertical direction. The position of each sensor row 52 in the length of the vehicle is the same. The length of each sensor row 52 corresponds to a sliding range of the front seat 7 in the length of the vehicle, where the position of the front seat 7 matches the position of the front door 3 in the length of the vehicle. That is, the sensor rows 52 have a length and a position by which a contact action of a passenger in the front seat 7 can be detected by the touch sensors 51 wherever the front seat 7 is positioned in the length of the vehicle.

Similarly, the contact detecting device 45 for the rear door 4 has a number of spot touch sensors 54. A plurality of the spot touch sensors 54 (13 spot touch sensors 54 in the present embodiment) are aligned at regular intervals in the length of the vehicle so as to form a linear sensor row 55 (corresponding to a divided portion of the present invention). The position of each sensor 54 of the sensor row 55 is the same in the vertical direction. A plurality of such sensor rows 55 (three rows in the present embodiment) are arranged at regular intervals in the vertical direction. The position of each sensor row 55 in the length direction of the vehicle is the same. The sensor rows 55 have a length and a position by which a contact action of a passenger in the rear seat 8 can be detected, where the position of the rear seat 8 matches the position of the rear door 4 in the length of the vehicle.

Basically, the control device 42 activates and deploys the side curtain airbag 40 when determining that the possibility of whether the vehicle 1 is going to roll over is high. Similarly to the first embodiment, before the activation, the control device 42 determines (i) whether a passenger is close to the inner surface 3a of the front door 3 by using the contact detecting device 44, and (ii) whether a passenger is close to the inner surface 4a of the rear door 4 by using the contact detecting device 45. According to the results of determination, the control device 42 controls whether the deployment of the side curtain airbag 40 is permitted or prohibited.

Therefore, in the second embodiment, the control device 42 determines (i) whether a contact action of a passenger has been detected by any of the touch sensors 51 included in the upper sensor row 52 of the front door 3, (ii) whether a contact action of the passenger has been detected by any of the touch sensors 51 included in the middle sensor row 52 of the front door 3, and (iii) whether a contact action of the passenger has been detected by any of the touch sensors 51 included in the lower sensor row 52 of the front door 3. When a contact action of the passenger has been detected by any of the touch sensors 51 in every sensor row 52 (i.e., when a contact action has been detected in every sensor row 52), the control device 42 determines that the whole body of the passenger is close to the inner surface 3a of the front door 3. In the other situations, control device 42 determines that no passenger is close to the inner surface 3a of the front door 3. That is, even when a contact action of the passenger is detected by the touch sensors 51 of any sensor row 52 of the front door 3, if the contact action is not detected by the touch sensors 51 of another sensor row 52, then the control device 42 determines that only an elbow (or another part of the body) of the passenger is close to the inner surface 3a of the front door 3 and the whole body of the passenger is not close to the inner surface 3a, so that it is determined that no passenger is close to the inner surface 3a of the front door 3. In addition, when no touch sensor 51 of the front door 3 detects a contact action of a passenger, the control device 42 determines that no passenger is close to the inner surface 3a of the front door 3 at all and that there is no closeness of a passenger to the inner surface 3a.

Similarly, the control device 42 determines whether a passenger is close to the inner surface 4a of the rear door 4 by using the contact detecting device 45 for the rear door 4.

Similarly to the first embodiment, when determining that the possibility of whether the vehicle 1 is going to roll over is high, the control device 42 prohibits deployment of the side curtain airbag 40 while at least one of the following conditions is satisfied: the first condition is that any passenger is close to the inner surface 3a of the front door 3, and the second condition is that any passenger is close to the inner surface 4a of the rear door 4. On the contrary, when the control device 42 determines that the possibility of whether the vehicle 1 is going to roll over is high but the conditions are otherwise than the above, that is, if there is no closeness of a passenger to either of the inner surfaces 3a and 4a, the control device 42 deploys the side curtain airbag 40.

Accordingly, effects similar to those obtained by the first embodiment can also be obtained in the second embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A passenger protection system for a vehicle having a door opening to which a door is attached, the system comprising:
    an airbag attached in a folded form along an upper edge of the door opening, wherein when being expanded, the airbag is deployed along an inner side surface of an interior of the vehicle in a drawn curtain form;
    a contact detecting device for detecting a contact action of a passenger in the vehicle with the contact detecting device; and
    a control device for determining whether a passenger is close to the inner side surface based on a result of detection of the contact detecting device, and prohibiting deployment of the airbag while determining that a passenger is close to the inner side surface,
    wherein the contact detecting device consists of a plurality of divided portions separated in a vertical direction, wherein each divided portion independently detects the contact action of the passenger.

2. The passenger protection system according to claim 1, wherein the contact detecting device has an elongated form in a length direction of the vehicle.

3. The passenger protection system according to claim 2, wherein: the vehicle has a sliding seat beside the door, which can slide in the length direction of the vehicle; and the contact detecting device has a length by which the contact action of the passenger can be detected wherever the sliding seat is positioned.

4. The passenger protection system according to claim 1, wherein each divided portion includes a plurality of spot touch sensors aligned in a length direction of the vehicle.

5. The passenger protection system according to claim 1, wherein only when every divided portion detects the contact action, the control device determines that a passenger is close to the inner side surface and prohibits the deployment of the airbag.

6. The passenger protection system according to claim 1, wherein when an angle of inclination of the vehicle is equal to or greater than a predetermined value, the control device deploys the airbag regardless of a result of detection by the contact detecting device.

7. A passenger protection system for a vehicle having a plurality of door openings to which a door is attached to each opening, the system comprising:

an airbag attached in a folded form along an upper edge of the plurality of door openings, wherein when being expanded, the airbag is deployed along an inner side surface of an interior of the vehicle in a drawn curtain form;

a contact detecting device provided for each door for detecting a contact action of a passenger in the vehicle with the contact detecting device; and a control device for determining whether a passenger is close to the inner side surface based on a result of detection of the contact detecting device, wherein each contact detecting device consists of a plurality of divided portions separated in a vertical direction, wherein each divided portion independently detects the contact action of the passenger for each contact detecting device, wherein the control device determines that a passenger is close to the inner side surface only when every divided portion of the contact detecting device detects the contact action, and wherein the control device prohibits the deployment of the airbag while determining that any passenger is close to the inner side surface based on a result of detection of any contact detecting device.

* * * * *